No. 619,854. Patented Feb. 21, 1899.
S. WEIBEL.
NUT LOCK.
(Application filed Dec. 12, 1898.)
(No Model.)
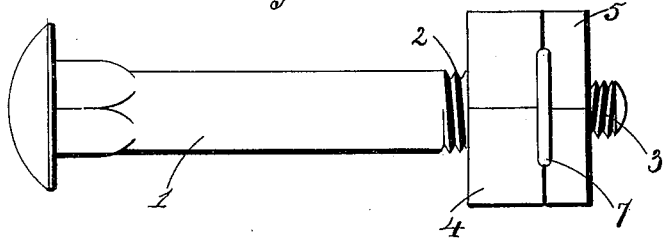
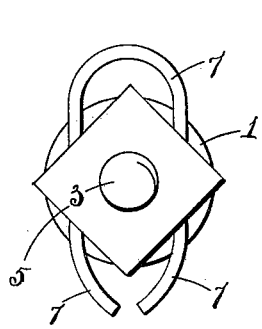
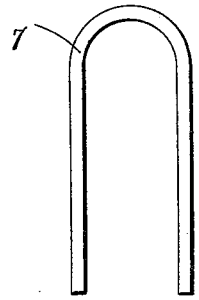
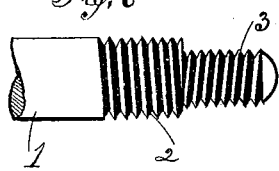
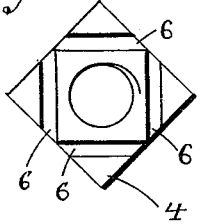
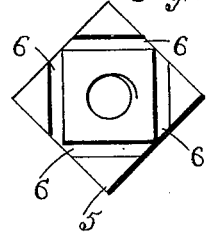
Witnesses:
N. W. Stevenson
Wm Evans
Inventor
Samuel Weibel.
By J. H. Stevenson
Atty
THE NORRIS PETERS CO., PHOTO-LITHO., WASHINGTON, D. C.

UNITED STATES PATENT OFFICE.

SAMUEL WEIBEL, OF LARIMER, PENNSYLVANIA.

NUT-LOCK.

SPECIFICATION forming part of Letters Patent No. 619,854, dated February 21, 1899.

Application filed December 12, 1898. Serial No. 699,102. (No model.)

*To all whom it may concern:*

Be it known that I, SAMUEL WEIBEL, a citizen of the United States of America, residing at Larimer P. O., in the county of Westmoreland and State of Pennsylvania, have invented certain new and useful Improvements in Nut-Locks; and I do hereby declare the following to be a full, clear, and exact description thereof, reference being had to the accompanying drawings, which form a part of this specification.

My invention relates to certain new and useful improvements in nut-locks.

The invention has for its object the provision of a new and novel means of locking the nuts or burs to the bolt, and is especially adapted for rail-joints, where the constant jarring has a tendency to unscrew the nuts, and for moving parts of machinery.

With the above object in view the invention consists in the novel form of construction, combination, and arrangement of parts, as will be hereinafter more specifically described in detail, and particularly pointed out in the claims.

In describing the invention in detail reference is had to the accompanying drawings, forming a part of this specification, wherein like numbers of reference designate like detail parts in the several views.

Figure 1 is a longitudinal side view of a bolt having attached my improved means of locking the nuts. Fig. 2 is an end view of the same. Fig. 3 is a view of the locking-staple removed. Fig. 4 is an inner face view of the right-hand-threaded nut. Fig. 5 is an inner face view of the left-hand-threaded nut. Fig. 6 is a longitudinal view of a portion of the bolt, showing the right and left hand threaded portions.

Referring now to the details entering into the construction, the numeral 1 designates a bolt of any approved form and provided with a right-hand-threaded portion 2 and left-hand-threaded portion 3, the latter being cut upon a reduced shoulder at the end of the bolt. The right-hand-threaded nut 4 and the left-hand-threaded nut 5 have formed upon their adjoining face portions the grooves 6, said grooves being placed at four distinct parts of the face. It is apparent that when placed in position upon the bolt but a quarter-turn of either nut will cause the grooves in their respective faces to register with one another. A double-pronged key or staple 7 is employed to enter said grooves and prevent either nut from turning. After entering the key or staple the ends of the same are contracted, as shown in Fig. 2, to prevent the same being accidentally withdrawn.

Slight modification in the detail parts may be made without departing from the general principle involved.

Having thus fully shown and set forth my invention, what I claim as new, and desire to secure by Letters Patent of the United States, is—

1. In a nut-lock, the combination with a right and left hand threaded bolt and the nut or burs of the same, of a groove or grooves formed within the adjoining face portions of the same which are adapted to register with one another, and a key or staple adapted to enter said grooves and lock said nuts together, all combined and arranged substantially as shown and set forth.

2. In a nut-lock, the combination with a right and left hand threaded bolt, and the nuts or burs of the same, of the grooves formed within the adjoining face portions, which are adapted to register with one another, and a pronged key or staple adapted to straddle the bolt and enter said grooves for the purpose of locking the nuts together, all arranged and combined substantially as shown and set forth.

In testimony whereof I have hereunto affixed my signature in the presence of two subscribing witnesses.

SAMUEL WEIBEL.

Witnesses:
 ADAM SCHADE,
 LOUIS SCHULTHEUS.